United States Patent Office 3,808,227
Patented Apr. 30, 1974

3,808,227
PYRAZOLO(THIONO) PHOSPHORIC(PHOSPHONIC) ACID ESTERS
Hellmut Hoffmann, Wuppertal-Elberfeld, and Ingeborg Hammann and Wolfgang Behrenz, Cologne, Germany, assignors to Bayer Aktiengesellschaft, Leverkusen, Germany
No Drawing. Filed Dec. 2, 1971, Ser. No. 204,312
Claims priority, application Germany, Dec. 8, 1970, P 20 60 198.3
Int. Cl. C07f 9/08, 9/40
U.S. Cl. 260—310 R                                7 Claims

ABSTRACT OF THE DISCLOSURE

Pyrazolo(thiono)phosphoric(phosphonic) acid esters of the general formula $$\begin{array}{c} RO \quad Y \\ \phantom{RO}\diagdown\!\!\parallel \\ \phantom{RO}\phantom{\diagdown}P\!-\!O\!-\!\!\!\begin{array}{c}CN \quad\quad OR_2\\ \phantom{OO}\diagup\phantom{OO}\\ \phantom{OO}N\!-\!R_3\\ \phantom{OO}\diagdown\!N\diagup\end{array} \\ R_1 \end{array} \quad (I)$$

in which

R is an alkyl radical with 1 to 6 carbon atoms,
$R_1$ is an alkyl or alkoxy radical with 1 to 6 carbon atoms,
$R_2$ and $R_3$ are lower alkyl radicals, and
Y is oxygen or sulfur, which possess insecticidal, acaricidal, rodenticidal and fungicidal properties.

---

The present invention relates to and has for its objects the provision of particular new pyrazolo(thiono)phosphoric(phosphonic) acid esters, i.e. O,O-dialkyl-O-[1-alkyl - 4 - cyano - 5 - alkoxypyrazol(3)yl] - phosphoric acid esters, thein alkanephosphonic acid analogues and the thiono analogues of each, which possess insecticidal, acaricidal, rodenticidal and fungicidal properties, active compositions in the form of mixtures of such compounds with solid and liquid dispersible carrier vehicles, and methods for producing such compounds and for using such compounds in a new way especially for combating pests, e.g. insects, acarids, rodents and fungi, especially insects and acarids, with other and further objects becoming apparent from a study of the within specification and accompanying examples.

From U.S. Pat. 2,754,244 it is known that methylpyrazolo - (thiono) - phosphoric acid esters, for example O,O - dimethyl - (Compound A) or O,O - diethyl - O - [5-methylpyrazol(3)yl]-thionophosphoric acid ester (Compound B), possess an insecticidal and acaricidal activity.

The present invention provides pyrazolo-(thiono)-phosphoric(phosphonic) acid esters of the general formula $$\begin{array}{c} RO \quad Y \\ \phantom{RO}\diagdown\!\!\parallel \\ \phantom{RO}\phantom{\diagdown}P\!-\!O\!-\!\!\!\begin{array}{c}CN \quad\quad OR_2\\ \phantom{OO}\diagup\phantom{OO}\\ \phantom{OO}N\!-\!R_3\\ \phantom{OO}\diagdown\!N\diagup\end{array} \\ R_1 \end{array} \quad (I)$$

in which

R is an alkyl radical with 1 to 6 carbon atoms,
$R_1$ is an alkyl or alkoxy radical with 1 to 6 carbon atoms,
$R_2$ and $R_3$ are lower alkyl radicals and
Y is oxygen or sulfur.

These compounds have been found to exhibit strong insecticidal and acaricidal, in some cases also rodenticidal and fungicidal, properties.

Surprisingly, the pyrazolo(thiono)phosphoric(phosphonic) acid esters according to the invention are distinguished by a considerably better insecticidal and acaricidal activity than the known methylpyrazolo-(thiono)-phosphoric acid esters of analogous constitution and of the same direction of activity. The compounds according to the invention therefore represent a genuine enrichment of the art.

The invention also provides a process for the production of a pyrazolo - (thiono) - phosphoric(phosphonic) acid ester of the Formula I in which a (thiono)phosphoric (phosphonic) acid ester halide of the general formula $$\begin{array}{c} RO \quad Y \\ \phantom{RO}\diagdown\!\!\parallel \\ \phantom{RO}\phantom{\diagdown}P\!-\!Hal \\ \phantom{RO}\diagup \\ R_1 \end{array} \quad (II)$$

is reacted with a 1-alkyl-3-hydroxy-4-cyano-5-alkyloxy-pyrazole of the general formula $$\begin{array}{c} HO\!-\!\!\!\begin{array}{c}\phantom{OO}\!-\!CN\\ \phantom{OO}\diagup\phantom{OO}\\ \phantom{OO}\!-\!OR_2\\ \phantom{OO}\diagdown\!N\diagup\end{array} \\ \phantom{OOOO}\,R_3 \end{array} \quad (III)$$

in the form of a salt or in the presence of an acid-binding agent, R, $R_1$, $R_2$, $R_3$ and Y in the aforesaid formulae having the meanings stated above, while Hal is halogen, preferably chlorine.

If, for example, O,O - diethylthionophosphoric acid diester chloride and 1-methyl - 3 - hydroxy - 4 - cyano-5-ethoxypyrazole are used as starting materials, the reaction course can be represented by the following formula scheme:

$$(C_2H_5O)_2\overset{S}{\underset{\parallel}{P}}\!-\!Cl + HO\!-\!\!\!\begin{array}{c}\phantom{OO}\!-\!CN\\ \phantom{OO}\diagup\phantom{OO}\\ \phantom{OO}\!-\!OC_2H_5\\ \phantom{OO}\diagdown\!N\diagup\end{array} \xrightarrow[-HCl]{\text{acid-binding agent}}$$

(IIa)       (IIIa)

$$(C_2H_5O)_2\overset{S}{\underset{\parallel}{P}}\!-\!O\!-\!\!\!\begin{array}{c}\phantom{OO}\!-\!CN\\ \phantom{OO}\diagup\phantom{OO}\\ \phantom{OO}\!-\!OC_2H_5\\ \phantom{OO}\diagdown\!N\diagup\end{array}$$

$$\phantom{OOOOOOOOOO}\,CH_3 \quad (IV)$$
(2)

R is preferably a straight-chain or branched lower alkyl radical with 1 to 4 carbon atoms such as methyl, ethyl, n- or iso-propyl, n-, iso-, sec.- or tert.-butyl. $R_1$ is preferably one of these lower alkyl radicals or a lower alkoxy radical with 1 to 4 carbon atoms. $R_2$ and $R_3$, which may be the same or different, desirably have up to 4 carbon atoms and are preferably methyl, ethyl, propyl or isopropyl.

As examples of (thiono)-phosphoric(phosphonic) acid ester halides of the Formula II there may be mentioned O,O-dimethyl-, O,O-diethyl-, O,O-dipropyl-, O,O-di-iso-propyl-, O,O-dibutyl-, O,O-di-tert.-butyl-, O-methyl-O-ethyl-, O-methyl-O-propyl-, O-methyl-O-iso-propyl-, O-methyl-O-butyl-, O-ethyl-O-propyl-, O-ethyl-O-iso-propyl-, O-ethyl-O-butyl-, O-propyl-O-iso-propyl-, O-butyl-O-tert.-butyl-phosphoric acid ester chloride and the corresponding thiono analogues; and O-butyl-methane, O-ethyl-methane-, O-ethyl-butane-, O-iso-propyl-methane-phosphonic acid ester chloride and the corresponding thiono compounds.

The (thiono)phosphoric(phosphonic) acid ester halides of the Formula II are known from the literature and are readily available, even on an industrial scale.

The pyrazole derivatives of the Formula III can be obtained by means of a process not belonging to the prior art, for example by ring closure through reaction of compounds of the following general formula

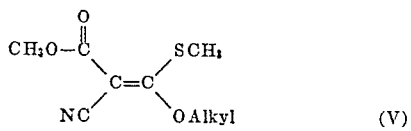

and monoalkylhydrazine.

The reaction according to the invention for the production of the compounds of Formula I is preferably carried out in the presence of a solvent or diluent. As such, practically all inert organic solvents are suitable. These include, in particular, aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether, and dioxane; ketones, such as acetone, methyl-ethyl ketone, methylisopropyl ketone and methylisobutyl ketone; and nitriles, such as acetonitrile and propionitrile.

The acid binding agent may for example be any of the usual acid acceptors. Particularly good results have been obtained with alkali metal carbonates and alcoholates, such as sodium and potassium carbonate, methylate or ethylate; further, aliphatic, aromatic ar heterocyclic amines, for example triethylamine, dimethylamine, dimethylamine, dimethylaniline, dimethylbenzylamine and pyridine.

The reaction temperature can be varied within a fairly wide range. In general, the reaction is carried out at about 0 to 120, preferably at about 30 to 40° C.

The reaction is, in general, carried out at normal pressure.

In carrying out the process, the reactants are in most cases used in approximately equimolar proportions. An excess of one or other of the reactants brings no substantial advantages. The reaction is preferably carried out in the presence of one of the above-mentioned solvents, as well as in the presence of an acid acceptor, at the temperatures stated. After several hours' stirring—optionally with heating—the reaction mixture may be poured into water, taken up with a hydrocarbon, preferably benzene, and worked up according to customary methods.

The products according to the invention are obtained in most cases in the form of colorless to slightly yellow-colored, viscous water-insoluble oils which cannot be distilled without decomposition but can, by so-called slight distillation, i.e. by prolonged heating at moderately elevated temperatures under reduced pressure, be freed from the last volatile components and can in this way be purified. The refractive index is particularly useful for their characterization. If however, the compounds are obtained in crystalline form, they are characterized by their melting points.

As already mentioned, the new pyrazolo-(thiono)-phosphoric(phosphonic) acid esters are distinguished by an outstanding insecticidal and acaricidal effectiveness against crop pests, hygiene pests and pests of stored products. They possess a good activity against both sucking and biting insects and mites (Acarina). At the same time they exhibit a low phytotoxicity. In some cases they exhibit rodenticidal and fungicidal properties. The products according to the invention may therefore be used as pesticides, especially in crop protection and the protection of stored products, as well as in the hygiene field.

To the sucking insects contemplated herein there belong, in the main, aphids (Aphidae)) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*), and, further, cicadas, such as *Euscelis bilobatus* and *Nephotettix bipunctatus*; and the like.

In the case of the biting insects contemplated herein, above all three should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphybma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogasfer*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), gall mites, for example the black current gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), ketone (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, rodenticides and fungicides, or bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi, bacteria and yeasts, and more particularly methods of combating at least one of insects and acarids, which comprises applying to at least one of correspondingly (a) such insects, (b) such acarids, (c) such fungi, (d) such rodents, and (e) the corresponding habitat thereof, i.e. the locus to be protected, a correspondingly combative or toxic amount, i.e. an insecticidally, acaricidally, fungicidally or rodenticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

(a) To 50 g. (0.5 mole) of cyanoacetic acid methyl ester and 0.5 mole of sodium methylate there are added 68 g. of S-methyl-O-ethyldithiocarbonic acid ester. The reaction which sets in proceeds slightly exothermally. The mixture is further stirred overnight at room temperature and triturated with ether, and the precipitate is filtered off with suction. After washing of the latter with ether, the reaction product is dried on clay. There are obtained 65 g. (62% of theory) of the desired compound α-cyano-β-sodiomercapto-β-ethoxy methyl acrylate

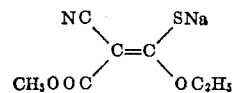

To 63 g. (0.3 mole) of this compound in 300 ml. of methanol there are added 38 g. of dimethylsulfonate, the temperature of the mixture rising by 15° C. After 3 hours' stirring, the mixture is poured into water, the precipitate is filtered off with suction, dried and recrystallized from methanol. 39 g. (65% of theory) of the following compound

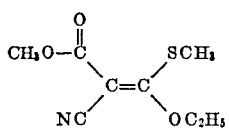

of the melting point 64° C. are obtained. 20 g. (0.1 mole) of this product in 200 ml. of methanol together with 4.6 g. of methylhydrazine are kept at a temperature of 5 to 7° C. for one hour. The mixture is subsequently stirred overnight. The separated crystals are filtered off with suction and recrystallized from methanol. There remain behind 10 g. (60% of theory) of the desired 1-methyl-3-hydroxy-4-cyano-5-ethoxypyrazole

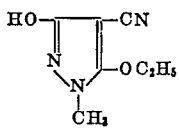

of the melting point 206° C.

The corresponding methoxy and iso-propoxy compounds are prepared in analogous manner and have the following physical properties:

| Formula | M.P., °C. | Yield, percent of theory |
|---|---|---|
| (IIIb) CN—/—OCH$_3$, HO—N—CH$_3$ | 192 | 74 |
| (IIIc) CN—/—OC$_3$H$_7$-i, HO—N—CH$_3$ | 180 | 59 |

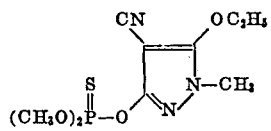

To a mixture of 50 g. (0.3 mole) of 1-methyl-3-hydroxy-4-cyano-5-ethoxypyrazole produced in (a) and 45 g. of potassium carbonate in 400 ml. of acetonitrile there are added 48 g. (0.3 mole) of O,O-dimethylthionophosphoric acid ester chloride, the internal temperature being initially kept to room temperature. The reaction mixture heats up to 38° C. after about 30 minutes. It is stirred overnight, poured into water, taken up with benzene and washed until there is a neutral reaction. After drying, the solvent is drawn off and the residue is slightly distilled. There remain behind 70 g. of the desired O,O-dimethyl-O-(1-methyl-4-cyano-5-ethoxypyrazol(3)yl)-thionophosphoric acid ester with the refractive index $n_D^{25}=1.5074$.

Calc. for C$_9$H$_{14}$N$_3$O$_4$PS (molecular weight 291) (percent): N, 14.4; S, 11.0; P, 10.6. Found (percent): N, 14.3; S, 10.9; P, 10.3.

The following compounds are prepared by analogous methods.

TABLE 1

| Formula | | Physical property: refractive index or melting point | Yield, percent of theory |
|---|---|---|---|
| CN—/—OC$_2$H$_5$, (C$_2$H$_5$O)$_2$P(S)—O—N—CH$_3$ | (2) | M.P. 45° C. | 85 |
| CN—/—OC$_2$H$_5$, C$_2$H$_5$(S)P(—O—)(C$_2$H$_5$O)—N—CH$_3$ | (3) | M.P. 51–52° C. | 89 |
| CN—/—OC$_2$H$_5$, (C$_2$H$_5$O)$_2$P(O)—O—N—CH$_3$ | (4) | $n_D^{23}=1.4708$ | 87 |
| CN—/—OC$_3$H$_7$-i, (C$_2$H$_5$O)$_2$P(O)—O—N—CH$_3$ | (5) | $n_D^{23}=1.4692$ | 85 |
| CN—/—OC$_3$H$_7$-i, (CH$_3$O)$_2$P(S)—O—N—CH$_3$ | (6) | $n_D^{24}=1.5031$ | 76 |
| NC—/—OC$_3$H$_7$-i, CH$_3$(S)P(—O—)(i-C$_3$H$_7$O)—N—CH$_3$ | (7) | $n_D^{24}=1.5048$ | 81 |
| CN—/—OC$_3$H$_7$-i, C$_2$H$_5$O(S)P(C$_2$H$_5$)—O—N—CH$_3$ | (8) | $n_D^{22}=1.5079$ | 87 |
| CN—/—OC$_3$H$_7$-i, (C$_2$H$_5$O)$_2$P(S)—O—N—CH$_3$ | (9) | $n_D^{23}=1.4937$ | 80 |
| CN—/—OCH$_3$, C$_2$H$_5$O(S)P(C$_2$H$_5$)—O—N—CH$_3$ | (10) | $n_D^{24}=1.5247$ | 88 |
| CN—/—OCH$_3$, (C$_2$H$_5$O)$_2$P(S)—O—N—CH$_3$ | (11) | $n_D^{24}=1.5081$ | 87 |
| CN—/—OCH$_3$, CH$_3$(S)P(—O—)(i-C$_3$H$_7$O)—N—CH$_3$ | (12) | M.P. 82° C. | 69 |
| CN—/—OCH$_3$, (C$_2$H$_5$O)$_2$P(O)—O—N—CH$_3$ | (13) | $n_D^{23}=1.4791$ | 90 |
| CN—/—OCH$_3$, (CH$_3$O)$_2$P(S)—O—N—CH$_3$ | (14) | M.P. 56° C. | 83 |

The following further examples are set forth to illustrate, without limitation, the process for producing the active compounds according to the present invention.

EXAMPLE 2

Plutella test

Solvent: 3 parts by weight acetone
Emulsifier: 1 part by weight alkylaryl polyglycol ether To produce a suitable preparation of active compounds, 1 part by weight of the active compound is mixed with the stated amount of solvent containing the stated amount of emulsifier and the concentrate is diluted with water to the desired concentration.

Cabbage leaves (Brassica oleracea) are sprayed with the preparation of the active compound until dew moist and are then infested with caterpillars of the diamondback moth (Plutella maculipennis).

After the specified periods of time, the degree of destruction is determined as a percentage: 100% means that all the caterpillars are killed whereas 0% means that none of the caterpillars are killed.

The active compounds, the concentrations of the active compounds, the evaluation time and the results can be seen from the following Table 2:

TABLE 2
(Plutella test)

| Active compound | | Concentration of active compound in percent | Degree of destruction in percent after 3 days |
|---|---|---|---|
| (C₂H₅O)₂P(S)—O—[pyrazole-CH₃, NH] (known) | (B) | 0.1<br>0.01 | 100<br>0 |
| (CH₃O)₂P(S)—O—[pyrazole-CH₃, NH] (known) | (A) | 0.1 | 0 |
| (CH₃O)₂P(S)—O—[pyrazole CN, OCH₃, N-CH₃] | (14) | 0.1<br>0.01 | 100<br>90 |
| (C₂H₅O)₂P(S)—O—[pyrazole CN, OCH₃, N-CH₃] | (11) | 0.1<br>0.01 | 100<br>100 |
| C₂H₅O, C₂H₅, P(S)—O—[pyrazole CN, OCH₃, N-CH₃] | (10) | 0.1<br>0.01<br>0.001 | 100<br>100<br>55 |
| CH₃, i-C₃H₇O, P(S)—O—[pyrazole CN, OCH₃, N-CH₃] | (12) | 0.1<br>0.01<br>0.001<br>0.0001 | 100<br>100<br>100<br>50 |
| (CH₃O)₂P(S)—O—[pyrazole CN, OC₂H₅, N-CH₃] | (1) | 0.1<br>0.01 | 100<br>100 |
| (C₂H₅O)₂P(S)—O—[pyrazole CN, OC₂H₅, N-CH₃] | (2) | 0.1<br>0.01<br>0.001 | 100<br>100<br>70 |
| C₂H₅O, C₂H₅, P(S)—O—[pyrazole CN, OC₂H₅, N-CH₃] | (3) | 0.1<br>0.01<br>0.001<br>0.0001 | 100<br>100<br>100<br>90 |
| (CH₃O)₂P(S)—O—[pyrazole CN, OC₃H₇-i, N-CH₃] | (6) | 0.1<br>0.01 | 100<br>100 |
| (C₂H₅O)₂P(S)—O—[pyrazole CN, OC₃H₇-i, N-CH₃] | (9) | 0.1<br>0.01<br>0.001 | 100<br>100<br>50 |
| C₂H₅O, C₂H₅, P(S)—O—[pyrazole CN, OC₃H₇-i, N-CH₃] | (8) | 0.1<br>0.01<br>0.001 | 100<br>100<br>100 |
| CH₃, i-C₃H₇O, P(S)—O—[pyrazole CN, OC₃H₇-i, N-CH₃] | (7) | 0.1<br>0.01<br>0.001 | 100<br>100<br>80 |
| (C₂H₅O)₂P(O)—O—[pyrazole CN, OCH₃, N-CH₃] | (13) | 0.1<br>0.01 | 100<br>100 |
| (C₂H₅O)₂P(O)—O—[pyrazole CN, OC₂H₅, N-CH₃] | (4) | 0.1<br>0.01<br>1.001 | 10<br>10<br>7 |

TABLE 2—Continued

| Active compound | | Concentration of active compound in percent | Degree of destruction in percent after 3 days |
|---|---|---|---|
| (C₂H₅O)₂P(O)—O—[pyrazole CN, OC₃H₇-i, N-CH₃] | (5) | 0.1<br>0.01<br>0.001 | 100<br>100<br>35 |

EXAMPLE 3

Myzus test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3:

TABLE 3
(Myzus test)

| Active compound | | Concentration of active compound in percent | Degree of destruction in percent after 1 day |
|---|---|---|---|
| (C₂H₅O)₂P(S)—O—[pyrazole-CH₃, NH] (known) | (B) | 0.1<br>0.01 | 100<br>30 |
| (CH₃O)₂P(S)—O—[pyrazole-CH₃, NH] (known) | (A) | 0.1 | 0 |
| (CH₃O)₂P(S)—O—[pyrazole CN, OCH₃, N-CH₃] | (14) | 0.1<br>0.01<br>0.001 | 100<br>100<br>100 |
| (C₂H₅O)₂P(S)—O—[pyrazole CN, OCH₃, N-CH₃] | (11) | 0.1<br>0.01<br>0.001 | 100<br>100<br>100 |
| C₂H₅O, C₂H₅, P(S)—O—[pyrazole CN, OCH₃, N-CH₃] | (10) | 0.1<br>0.01<br>0.001<br>0.0001 | 100<br>100<br>100<br>70 |
| CH₃, i-C₃H₇O, P(S)—O—[pyrazole CN, OCH₃, N-CH₃] | (12) | 0.1<br>0.01<br>0.001 | 100<br>100<br>99 |
| (CH₃O)₂P(S)—O—[pyrazole CN, OC₂H₅, N-CH₃] | (1) | 0.1<br>0.01<br>0.001 | 100<br>100<br>98 |

TABLE 3—Continued

| Active compound | | Concentration of active compound in percent | Degree of destruction in percent after 1 day |
|---|---|---|---|
| (C₂H₅O)₂P(S)—O—[pyrazole: CN, OC₂H₅, N—CH₃] | (2) | 0.1<br>0.01<br>0.001 | 100<br>98<br>90 |
| C₂H₅O(P)(S)(C₂H₅)—O—[pyrazole: CN, OC₂H₅, N—CH₃] | (3) | 0.1<br>0.01<br>0.001<br>0.0001 | 100<br>100<br>98<br>95 |
| (CH₃O)₂P(S)—O—[pyrazole: CN, OC₃H₇-i, N—CH₃] | (6) | 0.1<br>0.01<br>0.001<br>0.0001 | 100<br>100<br>100<br>90 |
| (C₂H₅O)₂P(S)—O—[pyrazole: CN, OC₃H₇-i, N—CH₃] | (9) | 0.1<br>0.01<br>0.001<br>0.0001 | 100<br>100<br>98<br>70 |
| C₂H₅O(P)(S)(C₂H₅)—O—[pyrazole: CN, OC₃H₇-i, N—CH₃] | (8) | 0.1<br>0.01<br>0.001<br>0.0001 | 100<br>100<br>100<br>100 |
| CH₃(P)(S)(i-C₃H₇O)—O—[pyrazole: CN, OC₃H₇-i, N—CH₃] | (7) | 0.1<br>0.01<br>0.001 | 100<br>100<br>99 |
| (C₂H₅O)₂P(O)—O—[pyrazole: CN, OCH₃, N—CH₃] | (13) | 0.1<br>0.01<br>0.001 | 100<br>100<br>85 |
| (C₂H₅O)₂P(O)—O—[pyrazole: CN, OC₂H₅, N—CH₃] | (4) | 0.1<br>0.01<br>0.001<br>0.0001 | 100<br>100<br>95<br>50 |
| (C₂H₅O)₂P(O)—O—[pyrazole: CN, OC₃H₇-i, N—CH₃] | (5) | 0.1<br>0.01<br>0.001 | 100<br>100<br>99 |

EXAMPLE 4

Tetranychus test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4:

TABLE 4
(Tetranychus test)

| Active compound | | Concentration of active compound in percent | Degree of destruction in percent after 2 days |
|---|---|---|---|
| (C₂H₅O)₂P(S)—O—[pyrazole: CH₃, NH] (known) | (B) | 0.1 | 0 |
| (CH₃O)₂P(S)—O—[pyrazole: CH₃, NH] (known) | (A) | 0.1 | 0 |
| (CH₃O)₂P(S)—O—[pyrazole: CN, OCH₃, N—CH₃] | (14) | 0.1<br>0.01 | 100<br>60 |
| (C₂H₅O)₂P(S)—O—[pyrazole: CN, OCH₃, N—CH₃] | (11) | 0.1<br>0.01 | 100<br>99 |
| C₂H₅O(P)(S)(C₂H₅)—O—[pyrazole: CN, OCH₃, N—CH₃] | (10) | 0.1<br>0.01 | 100<br>90 |
| CH₃(P)(S)(i-C₃H₇O)—O—[pyrazole: CN, OCH₃, N—CH₃] | (12) | 0.1<br>0.01<br>0.001 | 100<br>100<br>100 |
| (C₂H₅O)₂P(S)—O—[pyrazole: CN, OC₂H₅, N—CH₃] | (2) | 0.1<br>0.01 | 100<br>60 |
| C₂H₅O(P)(S)(C₂H₅)—O—[pyrazole: CN, OC₂H₅, N—CH₃] | (3) | 0.1<br>0.01 | 100<br>99 |
| (C₂H₅O)₂P(S)—O—[pyrazole: CN, OC₃H₇-i, N—CH₃] | (9) | 0.1<br>0.01<br>0.001 | 100<br>98<br>45 |
| CH₃(P)(S)(i-C₃H₇O)—O—[pyrazole: CN, OC₃H₇-i, N—CH₃] | (7) | 0.1<br>0.01<br>0.001 | 100<br>100<br>70 |
| (C₂H₅O)₂P(O)—O—[pyrazole: CN, OCH₃, N—CH₃] | (13) | 0.1<br>0.01 | 100<br>40 |

EXAMPLE 5

Mosquito larvae test

Test insects: *Aedes aegypti* larvae
Solvent: 99 parts by weight acetone
Emulsifier: 1 part by weight benzylhydroxydiphenyl polyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test insects and the results can be seen from Table 5:

TABLE 5
(Mosquito larvae test/*Aedes aegypti*)

| Active compound | | Concentration of active compound of the solution in p.p.m. | Degree of destruction in percent |
|---|---|---|---|
| 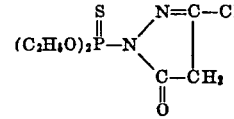 (known) | (B) | 10 | 100 |
| 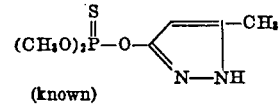 (known) | (A) | 10 | 0 |
| 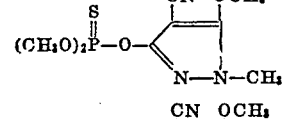 | (14) | 10 / 1 / 0.1 | 100 / 100 / 60 |
| 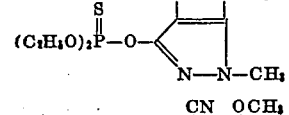 | (11) | 10 / 1 / 0.1 | 100 / 100 / 100 |
| 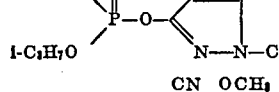 | (12) | 10 / 1 / 0.1 | 100 / 100 / 100 |
| 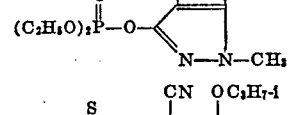 | (13) | 10 / 1 | 100 / 100 |
| 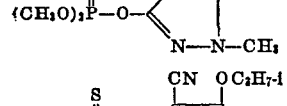 | (6) | 10 / 1 / 0.1 | 100 / 100 / 100 |
| 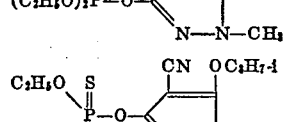 | (9) | 10 / 1 / 0.1 | 100 / 100 / 90 |
| 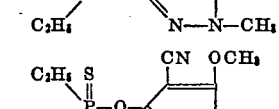 | (8) | 10 / 1 / 0.1 | 100 / 100 / 100 |
| 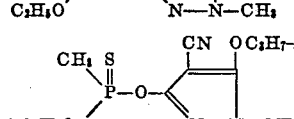 | (10) | 10 / 1 / 0.1 | 100 / 100 / 100 |
| 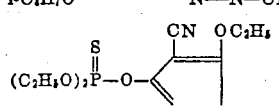 | (7) | 10 / 1 | 100 / 100 |
|  | (2) | 10 / 1 / 0.1 | 100 / 100 / 70 |

TABLE 5—Continued

| Active compound | | Concentration of active compound of the solution in p.p.m. | Degree of destruction in percent |
|---|---|---|---|
| 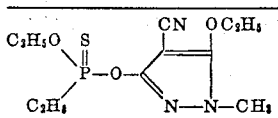 | (3) | 10 / 1 | 100 / 100 |
| 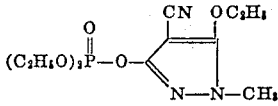 | (4) | 10 / 1 | 100 / 100 |

EXAMPLE 6

LT$_{100}$ test for Diptera

Test animals: *Aedes aegypti*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test animals are then placed in the Petri dish and it is covered with a glass lid.

The condition of the test animals is observed after 1, 2 and 3 hours. The time which is necessary for a 100% destruction is determined.

The test animals, the active compounds, the concentrations of the active compounds and the periods of time at which there is a 100% destruction can be seen from the following Table 6:

TABLE 6
(LT$_{100}$ test for Diptera/*Aedes aegypti*)

| Active compound | | Concentration of active compound of the solution in percent | LT$_{100}$ |
|---|---|---|---|
| 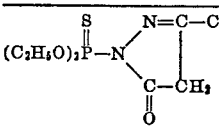 (known) | (C) | 0.2 / 0.02 | 60' / 120' |
| 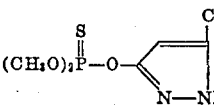 (known) | (A) | 0.2 | 3$^h$=30% |
| 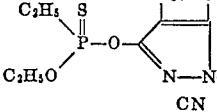 | (10) | 0.2 / 0.02 / 0.002 | 60' / 60' / 3$^h$=60% |
| 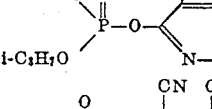 | (12) | 0.2 / 0.02 / 0.002 | 60' / 60' / 180' |
| 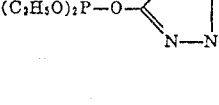 | (13) | 0.2 / 0.02 / 0.002 | 60' / 60' / 3$^h$=50% |

TABLE 6—Continued

| Active compound | Concentration of active compound of the solution in percent | LT₁₀₀ |
|---|---|---|
| (CH₃O)₂P(S)—O—[pyrazole: CN, OC₃H₇-i, N—N—CH₃] (6) | 0.2<br>0.02<br>0.002 | 60'<br>60'<br>180' |
| (C₂H₅O)₂P(S)—O—[pyrazole: CN, OC₃H₇-i, N—N—CH₃] (9) | 0.2<br>0.02<br>0.002 | 60'<br>60'<br>180' |
| C₂H₅O(C₂H₅)P(S)—O—[pyrazole: CN, OC₂H₅, N—N—CH₃] (3) | 0.2<br>0.02<br>0.002 | 60'<br>60'<br>60' |

EXAMPLE 7

LT₁₀₀ test for Diptera

Test animals: *Musca domestica*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test animals are then placed in the Petri dish and it is covered with a glass lid.

The condition of the test animals is periodically observed. The time which is necessary for a 100% knock down effect is determined.

The test animals, the active compounds, the concentrations of the active compounds and the periods of time at which there is a 100% knock down effect can be seen from the following Table 7:

TABLE 7
(LT₁₀₀ test for Diptera/*Musca domestica*)

| Active compound | Concentration of active compound of the solution in percent | LT₁₀₀ |
|---|---|---|
| (C₂H₅O)₂P(S)—N[—N=C(CH₃)—C(=O)—CH₃] (C) (known) | 0.2 | 8ʰ |
| (CH₃O)₂P(S)—O—[pyrazole—CH₃, NH] (A) (known) | 0.2 | 8ʰ=70% |
| (CH₃O)₂P(S)—O—[pyrazole: CN, OCH₃, N—N—CH₃] (14) | 0.2<br>0.02<br>0.002<br>0.0002 | 80'<br>85'<br>8ʰ<br>8ʰ=60% |
| (C₂H₅O)₂P(S)—O—[pyrazole: CN, OCH₃, N—N—CH₃] (11) | 0.2<br>0.02 | 75'<br>240' |
| C₂H₅(C₂H₅O)P(S)—O—[pyrazole: CN, OCH₃, N—N—CH₃] (10) | 0.2<br>0.02<br>0.008 | 45'<br>110'<br>8ʰ |
| CH₃(i-C₃H₇O)P(S)—O—[pyrazole: CN, OCH₃, N—N—CH₃] (12) | 0.2<br>0.02<br>0.002 | 85'<br>85'<br>8ʰ=50% |
| (C₂H₅O)₂P(O)—O—[pyrazole: CN, OCH₃, N—N—CH₃] (13) | 0.2<br>0.02<br>0.002<br>0.0002 | 60'<br>100'<br>6ʰ<br>8ʰ=60% |
| (CH₃O)₂P(S)—O—[pyrazole: CN, OC₃H₇-i, N—N—CH₃] (6) | 0.2<br>0.02<br>0.002 | 65'<br>65'<br>8ʰ=80% |
| (C₂H₅O)₂P(S)—O—[pyrazole: CN, OC₃H₇-i, N—N—CH₃] (9) | 0.2<br>0.02 | 65'<br>220' |
| C₂H₅O(C₂H₅)P(S)—O—[pyrazole: CN, OC₃H₇-i, N—N—CH₃] (8) | 0.2<br>0.02<br>0.002 | 55'<br>65'<br>160' |
| CH₃(i-C₃H₇O)P(S)—O—[pyrazole: CN, OC₃H₇-i, N—N—CH₃] (7) | 0.2<br>0.02 | 60'<br>160' |
| (C₂H₅O)₂P(O)—O—[pyrazole: CN, OC₃H₇-i, N—N—CH₃] (5) | 0.2<br>0.02<br>0.002 | 30'<br>45'<br>8ʰ=40% |
| (CH₃O)₂P(S)—O—[pyrazole: CN, OC₂H₅, N—N—CH₃] (1) | 0.2<br>0.02<br>0.002 | 60'<br>195'<br>6ʰ=50% |
| (C₂H₅O)₂P(S)—O—[pyrazole: CN, OC₂H₅, N—N—CH₃] (2) | 0.2<br>0.02<br>0.002 | 35'<br>125'<br>8ʰ=90% |
| C₂H₅O(C₂H₅)P(S)—O—[pyrazole: CN, OC₂H₅, N—N—CH₃] (3) | 0.2<br>0.02<br>0.002 | 40'<br>85'<br>6ʰ=90% |
| (C₂H₅O)₂P(O)—O—[pyrazole: CN, OC₂H₅, N—N—CH₃] (4) | 0.2<br>0.02 | 35'<br>120' |

EXAMPLE 8

LD₁₀₀ test

Test animals: *Sitophilus granarius*
Solvent: acetone 2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm.

The Petri dish remains uncovered until the solvent has completely evaporated. The amount of active compound per square meter of filter paper varies with the concentration of the solution of active compound used. 25 test animals are then placed in the Petri dish and it is covered with a glass lid.

The condition of the test animals is observed 3 days after the commencement of the experiments. The destruction is determined as a percentage.

The active compounds, the concentrations of the active compounds, the test animals and the results can be seen from the following Table 8:

TABLE 8
($LD_{100}$ test/*Sitophilus granarius*)

| Active compound | | Concentration of active compound of the solution in percent | Degree of destruction in percent |
|---|---|---|---|
| $(C_2H_5O)_2\overset{S}{\underset{\|}{P}}-N\begin{smallmatrix}N=C-CH_3\\ \|\\ C-CH_2\\ \|\\ O\end{smallmatrix}$ (known) | (C) | 0.2<br>0.02 | 100<br>70 |
| $(CH_3O)_2\overset{S}{\underset{\|}{P}}-O-\begin{smallmatrix}-CH_3\\ \|\\ N---NH\end{smallmatrix}$ (known) | (A) | 0.2 | 0 |
| $(CH_3O)_2\overset{S}{\underset{\|}{P}}-O-\begin{smallmatrix}CN\ OCH_3\\ \|\ \|\\ N---N-CH_3\end{smallmatrix}$ | (14) | 0.2<br>0.02<br>0.002 | 100<br>100<br>100 |
| $\begin{smallmatrix}C_2H_5\\ \diagdown\\ P\\ \diagup\\ C_2H_5O\end{smallmatrix}\overset{S}{\underset{\|}{}}-O-\begin{smallmatrix}CN\ OCH_3\\ \|\ \|\\ N---N-CH_3\end{smallmatrix}$ | (10) | 0.2<br>0.02<br>0.002 | 100<br>100<br>100 |
| $\begin{smallmatrix}CH_3\\ \diagdown\\ P\\ \diagup\\ i\text{-}C_3H_7O\end{smallmatrix}\overset{S}{\underset{\|}{}}-O-\begin{smallmatrix}CN\ OCH_3\\ \|\ \|\\ N---N-CH_3\end{smallmatrix}$ | (12) | 0.2<br>0.02<br>0.002 | 100<br>100<br>100 |
| $(CH_3O)_2\overset{S}{\underset{\|}{P}}-O-\begin{smallmatrix}CN\ OC_3H_7\text{-}i\\ \|\ \|\\ N---N-CH_3\end{smallmatrix}$ | (6) | 0.2<br>0.02<br>0.002 | 100<br>100<br>100 |

TABLE 8—Continued

| Active compound | | Concentration of active compound in percent | Degree of destruction in percent after 2 days |
|---|---|---|---|
| $(CH_3O)_2\overset{S}{\underset{\|}{P}}-O-\begin{smallmatrix}CN\ OC_2H_5\\ \|\ \|\\ N---N-CH_3\end{smallmatrix}$ | (1) | 0.2<br>0.02<br>0.002 | 100<br>100<br>80 |
| $(C_2H_5O)_2\overset{S}{\underset{\|}{P}}-O-\begin{smallmatrix}CN\ OC_2H_5\\ \|\ \|\\ N---N-CH_3\end{smallmatrix}$ | (2) | 0.2<br>0.02<br>0.002 | 100<br>100<br>90 |
| $\begin{smallmatrix}C_2H_5O\\ \diagdown\\ P\\ \diagup\\ C_2H_5\end{smallmatrix}\overset{S}{\underset{\|}{}}-O-\begin{smallmatrix}CN\ OC_2H_5\\ \|\ \|\\ N---N-CH_3\end{smallmatrix}$ | (3) | 0.2<br>0.02<br>0.002 | 100<br>100<br>100 |

EXAMPLE 9

Critical concentration test/soil insects

Test insect: *Phorbia brassicae* (maggots)
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the rseults can be seen from the following Table 9:

TABLE 9
Soil insecticides
(*Phorbia brassicae* maggots in the soil)

| | | Degree of destruction in percent | | | | | |
|---|---|---|---|---|---|---|---|
| Concentration of active compound in p.p.m. | | 20 | 10 | 5 | 2.5 | 1.25 | 0.625 |
| Active compound (constitution): | | | | | | | |
| $(C_2H_5O)_2\overset{S}{\underset{\|}{P}}-O-\begin{smallmatrix}CN\text{---}OC_2H_5\\ \|\\ N-CH_3\\ N\end{smallmatrix}$ | (2) | 100 | 100 | 100 | 100 | 100 | 75 |
| $(CH_3O)_2\overset{S}{\underset{\|}{P}}-O-\begin{smallmatrix}CN\text{---}OC_2H_5\\ \|\\ N-CH_3\\ N\end{smallmatrix}$ | (1) | 100 | 100 | 100 | 50 | | |
| $\begin{smallmatrix}C_2H_5\\ \diagdown\\ P\\ \diagup\\ C_2H_5O\end{smallmatrix}\overset{S}{\underset{\|}{}}-O-\begin{smallmatrix}CN\text{---}OC_2H_5\\ \|\\ N-CH_3\\ N\end{smallmatrix}$ | (3) | 100 | 100 | 100 | 100 | 60 | 50 |
| $(C_2H_5O)_2\overset{S}{\underset{\|}{P}}-O-\begin{smallmatrix}CN\text{---}OC_3H_7\text{-}i\\ \|\\ N-CH_3\\ N\end{smallmatrix}$ | (9) | 100 | 100 | 100 | 100 | 100 | 100 |

TABLE 9—Continued

| Structure | Compound | \multicolumn{6}{c}{Degree of destruction in percent} |
| --- | --- | --- | --- | --- | --- | --- | --- |
| Concentration of active compound in p.p.m. | | 20 | 10 | 5 | 2.5 | 1.25 | 0.625 |
| $C_2H_5O$, $C_2H_5$ — P(=S) — O — [pyrazole: CN, $OC_3H_7$-i, N—$CH_3$] | (8) | 100 | 100 | 100 | 100 | 100 | 100 |
| $CH_3$, i-$C_3H_7O$ — P(=S) — O — [pyrazole: CN, $OC_3H_7$-i, N—$CH_3$] | (7) | 100 | 100 | 100 | 100 | 80 | 50 |
| $(CH_3O)_2$P(=S) — O — [pyrazole: CN, $OC_3H_7$-i, N—$CH_3$] | (6) | 100 | 100 | 98 | 95 | 50 | — |
| $C_2H_5O$, $C_2H_5$ — P(=S) — O — [pyrazole: CN, $OCH_3$, N—$CH_3$] | (10) | 100 | 100 | 98 | 98 | 75 | 50 |
| $(C_2H_5O)_2$P(=S) — O — [pyrazole: CN, $OCH_3$, N—$CH_3$] | (11) | 100 | 100 | 100 | 100 | 100 | 50 |
| $(CH_3O)_2$P(=S) — O — [pyrazole: CN, $OCH_3$, N—$CH_3$] | (14) | 100 | 100 | 50 | — | — | — |
| $CH_3$, i-$C_3H_7O$ — P(=S) — O — [pyrazole: CN, $OCH_3$, N—$CH_3$] | (12) | 100 | 100 | 50 | — | — | — |
| $C_2H_5O$, $C_2H_5O$ — P(=S) — N[N=C—$CH_3$; C(=O)—$CH_3$] (known) | (C) | 0 | — | — | — | — | — |
| [pyrazole: $CH_3$, N—H] — O — P(=S)(OCH_3)_2 (known) | (A) | 0 | — | — | — | — | — |

EXAMPLE 10

Critical concentration test/soil insects

Test insect: *Tenebrio molitor* larvae
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 10:

TABLE 10
Soil insecticides
(*Tenebrio molitor* larvae in the soil)

| Active compound (constitution): | | Degree of destruction in percent | | | | |
|---|---|---|---|---|---|---|
| Concentration of active compound in p.p.m. | | 20 | 10 | 5 | 2.5 | 1.25 |
| (C$_2$H$_5$O)$_2$P(S)—O—[1-methyl-4-CN-5-OC$_2$H$_5$-pyrazol-3-yl] | (2) | 100 | 100 | 50 | | |
| C$_2$H$_5$(C$_2$H$_5$O)P(S)—O—[1-methyl-4-CN-5-OC$_2$H$_5$-pyrazol-3-yl] | (3) | 100 | 100 | 100 | 20 | |
| (C$_2$H$_5$O)$_2$P(S)—O—[1-methyl-4-CN-5-OC$_3$H$_7$-i-pyrazol-3-yl] | (9) | 100 | 100 | 90 | | |
| C$_2$H$_5$(C$_2$H$_5$O)P(S)—O—[1-methyl-4-CN-5-OC$_3$H$_7$-i-pyrazol-3-yl] | (8) | 100 | 100 | 100 | 100 | 70 |
| CH$_3$(i-C$_3$H$_7$O)P(S)—O—[1-methyl-4-CN-5-OC$_3$H$_7$-i-pyrazol-3-yl] | (7) | 100 | 100 | 100 | 50 | |
| (CH$_3$O)$_2$P(S)—O—[1-methyl-4-CN-5-OC$_3$H$_7$-i-pyrazol-3-yl] | (6) | 100 | 100 | 90 | 50 | |
| C$_2$H$_5$(C$_2$H$_5$O)P(S)—O—[1-methyl-4-CN-5-OCH$_3$-pyrazol-3-yl] | (10) | 100 | 100 | 100 | 20 | |
| CH$_3$(i-C$_3$H$_7$O)P(S)—O—[1-methyl-4-CN-5-OCH$_3$-pyrazol-3-yl] | (12) | 100 | 100 | 98 | 20 | |
| (C$_2$H$_5$O)$_2$P(S)—N(C(=O)CH$_3$)(N=C-CH$_3$) (known) | (C) | 0 | | | | |
| 3-methyl-pyrazol-5-yl-O-P(S)(OCH$_3$)$_2$ (known) | (A) | 0 | | | | |

It will be appreciated that the instant specification and examples are set forth by way of illustration and not limitation, and that various modifications and changes may be made without departing from the spirit and scope of the present invention.

What is claimed is:

1. A pyrazolo - (thiono)-phosphoric(phosphonic)acid ester of the formula

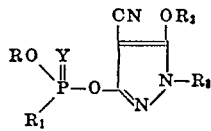

(1)

in which
R is alkyl of 1 to 6 carbon atoms,
R$_1$ is alkyl or alkoxy of 1 to 6 carbon atoms,
R$_2$ and R$_3$ are lower alkyl, and
Y is oxygen or sulfur.

2. A compound according to claim 1 in which R and R$_1$ are alkyl 1 to 4 carbon atoms, and R$_2$ and R$_3$ are methyl, ethyl, propyl or isopropyl.

3. The compound according to claim 1 wherein such compound is O - ethyl - O-[1-methyl-4-cyano-5-ethoxy-pyrazol(3)yl]ethanethionophosphonic acid ester of the formula

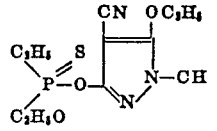

(3)

4. The compound according to claim 1 wherein such compound is O,O - dimethyl-O-[1-methyl-4-cyano-5-isopropoxypyrazol(3)yl]thionophosphoric acid ester of the formula

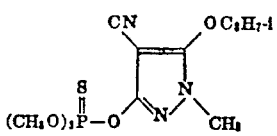

(6)

5. The compound according to claim 1 wherein such compound is O-ethyl-O-[1-methyl-4-cyano-5-isopropoxypyrazol(3)yl]ethanethionophosphonic acid ester of the formula

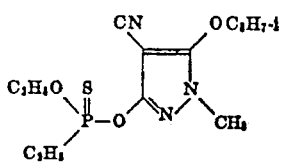

(8)

6. The compound according to claim 1 wherein such compound is O-ethyl-O-[1-methyl-4-cyano-5-methoxypyrazol(3)yl]ethanethionophosphonic acid ester of the formula

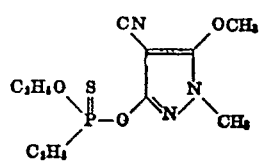

(10)

7. The compound according to claim 1 wherein such compound is O-isopropoxy-O-[1-methyl-4-cyano-5-methoxypyrazol(3)yl]-methanethionophosphonic acid ester of the formula

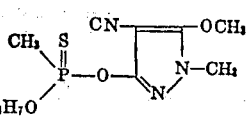

(12)

References Cited

UNITED STATES PATENTS

| 2,754,244 | 7/1956 | Gysin et al. | 260—310 R |
| 2,998,426 | 8/1961 | Dickinson et al. | 260—310 R |
| 3,111,525 | 11/1963 | Meltzer et al. | 260—310 R |
| 3,216,894 | 11/1965 | Lorenz et al. | 260—310 R |

FOREIGN PATENTS

| 1,942,561 | 2/1971 | Germany | 260—310 R |

OTHER REFERENCES

Conant et al.: The Chemistry of Organic Compounds, 3rd ed., p. 342 N.Y., MacMillan, 1947.

NATALIE TROUSOF, Primary Examiner

U.S. Cl. X.R.

260—465.4; 424—200

UNITED STATES PATENT OFFICE
CERTIFICATE OF CORRECTION

Patent No. 3,808,227      Dated   April 30, 1974

Inventor(s)   HELLMUT HOFFMANN ET AL

It is certified that error appears in the above-identified patent and that said Letters Patent are hereby corrected as shown below:

Col. 1, line 37, correct spelling of "their".

Col. 3, line 27, change "ar" to -- or --.

Col. 4, line 14, change "three" to -- there --.

Col. 9, Table 2, Compound (4), in the last column of the Table, change "1.001" to -- 0.001 --.

Col. 16, Table 7, Compound 5, correct formula to read as follow

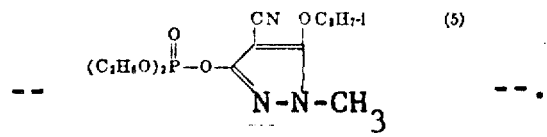

--.

Col. 18, line 48, correct spelling of "results"

Col. 22, line 70, Claim 3, correct formula to read as follows:

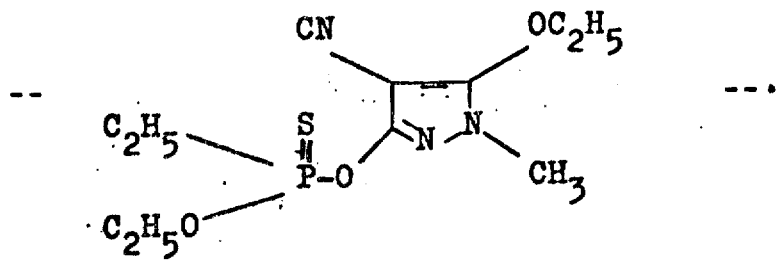

--.

Signed and sealed this 5th day of November 1974.

(SEAL)
Attest:

McCOY M. GIBSON JR.
Attesting Officer

C. MARSHALL DANN
Commissioner of Patents